(12) United States Patent
Lin et al.

(10) Patent No.: US 6,502,460 B1
(45) Date of Patent: Jan. 7, 2003

(54) FLUID LEVEL MEASURING SYSTEM

(75) Inventors: Yingjie Lin, El Paso, TX (US); Lorenzo Guadalupe Rodriguez, Chihuahua (MX); Gregory Jon Manlove, Kokomo, IN (US); Maria De Los Angeles Chee, Chih. (MX)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/481,220

(22) Filed: Jan. 11, 2000

(51) Int. Cl.[7] .............................................. G02F 23/26
(52) U.S. Cl. .................................................... 73/304 C
(58) Field of Search ........................... 73/304 C, 290 R

(56) References Cited

U.S. PATENT DOCUMENTS

| | | | | |
|---|---|---|---|---|
| 4,173,893 A | * | 11/1979 | Hendick | .................. 73/304 R |
| 4,204,427 A | * | 5/1980 | Gothe et al. | ............. 73/304 C |
| 4,383,444 A | * | 5/1983 | Beaman et al. | ........... 73/304 C |
| 4,392,378 A | * | 7/1983 | Pitches et al. | ............ 73/304 C |
| 4,547,725 A | * | 10/1985 | Oetiker et al. | ............ 324/61 R |
| 4,924,702 A | * | 5/1990 | Park | ......................... 73/304 C |
| 5,103,368 A | * | 4/1992 | Hart | ............................. 361/284 |
| 5,477,727 A | * | 12/1995 | Koga | ....................... 73/304 C |

* cited by examiner

Primary Examiner—Hezron Williams
Assistant Examiner—Katina Wilson
(74) Attorney, Agent, or Firm—Margaret A. Dobrowitsky

(57) ABSTRACT

An oil level sensor for a vehicle includes a receiver tube oriented upright in the oil pan of the vehicle. A level tube is disposed in the receiver tube and below the level tube is a reference tube. A circuit is electrically connected to the tubes for outputting a signal representative of oil level in the oil pan. As the engine oil level decreases within the level tube, the output of the sensor drops. When the engine oil level is below the bottom of the level tube but higher than the top of the reference tube, the output reaches the lowest value. As the engine oil level continuous decreasing (below the top of the reference tube), the output increases for a first circuit configuration (i.e., level with reference tube), and will stay constant for the second configuration level.

6 Claims, 2 Drawing Sheets

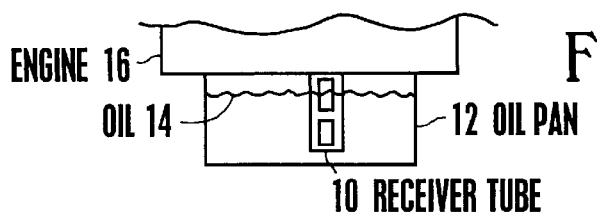
Fig. 1
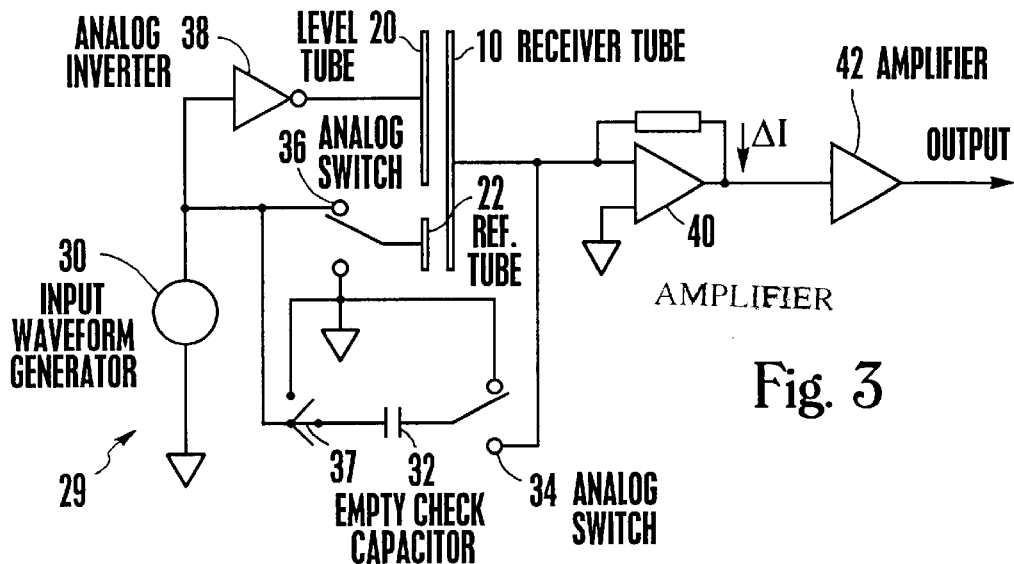
Fig. 3
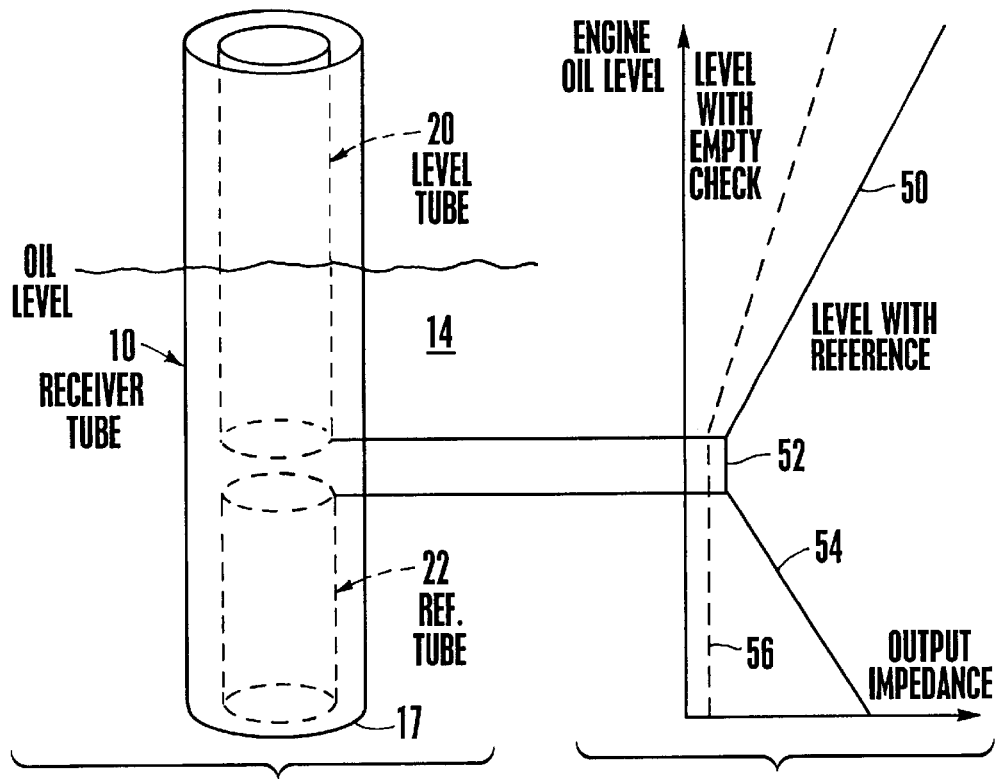
Fig. 2
Fig. 4

FLUID LEVEL MEASURING SYSTEM

TECHNICAL FIELD

The present invention relates generally to systems and methods for measuring fluid levels, and more particularly to methods and structure for measuring oil level in a vehicle engine.

BACKGROUND OF THE INVENTION

Accurately measuring fluid levels is important in many applications. As but one example, automatically monitoring the quality and amount of oil in a vehicle alerts drivers in a timely fashion when maintenance should be performed as dictated by the actual condition of the vehicle. Performing maintenance when it is actually required is preferred over following a predetermined, one-size-fits-all schedule that might be too long or too short for any given vehicle, depending on the way the vehicle is driven. If too long a period elapses between maintenance, a vehicle can be damaged. On the other hand, conducting maintenance when it is not needed is wasteful both in terms of labor and in terms of natural resources. For example, if a vehicle doesn't require an oil change but nevertheless receives one, oil is in effect wasted.

Accordingly, systems have been provided for measuring various parameters of a vehicle's engine oil, and to generate warning signals when maintenance is due as indicated by the condition of the oil. Among the parameters that are typically measured are oil temperature, condition, and level, and the signals from multiple sensors can be combined to generate the final engine oil maintenance signal. Of importance to the present invention is the accurate measurement of oil level.

As understood herein, oil level depends on many factors. Electrical properties of oil are used to measure level, which has the advantage of providing very accurate measurements. We have recognized, however, that the electrical properties depend on, among other things, temperature, oil brand, oil condition, oil contamination, making it difficult to accurately measure oil level over a wide temperature range and independently of brand and condition.

In conventional oil level sensors, a reference sensor is used along with a level sensor. The signal from the level sensor is divided by the signal from the reference sensor to cancel the effects of oil condition and so on, leaving a signal that represents level only.

Unfortunately, existing sensors have very small signal strengths, and, hence, poor signal-to-noise ratios. Significant amplification of the output signal is required, and this in turn introduces noise amplification and the problems attendant thereto. Moreover, to eliminate temperature differential effects the two sensors should be positioned close together. However, placing the sensors close together normally dictates using a relatively low input signal frequency that might not be effective at low oil temperatures. The present invention has recognized these prior art drawbacks, and has provided the below-disclosed solutions to one or more of the prior art deficiencies.

SUMMARY OF THE INVENTION

A fluid level sensor includes a receiver tube that is positionable in a container of fluid, such as a vehicle oil pan. The receiver tube defines an upright orientation when installed in the container, and a level tube is coaxially disposed in the receiver tube. Moreover, a reference tube is coaxially disposed in the receiver tube below the level tube relative to the upright orientation. As disclosed in detail below, a circuit is electrically connected to the tubes for outputting a signal representative of fluid level in the container.

In the preferred embodiment, each tube defines a respective interior communicating with the container, such that fluid in the pan can enter the interior of each tube. Each tube is made of metal, and the level tube and receiver tube together establish a first capacitor and the reference tube and receiver tube together establish a second capacitor. With this in mind, the above-mentioned circuit includes an output amplifier outputting a signal representative of voltage, as well as an input signal generator. The first capacitor interconnects the output amplifier and input signal generator. At least one switch selectively connects the second capacitor to ground.

In a particularly preferred embodiment, the circuit further includes at least one empty check capacitor connected to the switch. The switch is movable between a first position, wherein the second capacitor interconnects the output amplifier with the input signal generator and the empty check capacitor is connected to ground, and a second position, wherein the second capacitor is connected to ground and the empty check capacitor interconnects the output amplifier with the input signal generator. The input signal generator generates a sinusoidal wave, square wave, or triangle wave.

In another aspect, a method for measuring liquid level in a chamber includes providing a receiver tube and disposing a level tube in the receiver tube to establish a first capacitor. The method further includes disposing a reference tube in the receiver tube below the level tube to establish a second capacitor. The capacitors are connected to an electrical circuit having an input signal generator and an output. Using the circuit, the method envisions selectively connecting one of: the first capacitor, or second capacitor, to ground and then to the output, and outputting a signal representative of the level of liquid in the chamber.

In yet another aspect, an oil level sensor for a vehicle includes an oil pan, a receiver tube oriented upright in the oil pan, and a level tube in the receiver tube. The sensor also includes a reference tube in the receiver tube below the level tube.

In still another aspect, a fluid level sensor includes a reference plate positionable in a container of fluid. An upper plate is closely spaced from the reference plate, and a lower plate is also closely spaced from the reference plate below the upper plate. A circuit is electrically connected to the tubes for outputting a signal representative of fluid level in the container.

The details of the present invention, both as to its structure and operation, can best be understood in reference to the accompanying drawings, in which like reference numerals refer to like parts, and in which:

BRIEF DESCRIPTION OF THE DRAWINGS

FIG. 1 is a schematic view of the present receiver tube mounted in the engine oil pan;

FIG. 2 is a schematic plan view of the level tube and reference tube disposed in the receiver tube;

FIG. 3 is a schematic diagram of the electrical circuit used to sense impedance ratios;

FIG. 4 is a graph which represents the output of the electrical circuit shown in FIG. 3 when connected to the receiver tube shown in FIG. 1.

DESCRIPTION OF AN EMBODIMENT OF THE INVENTION

Figure 5:
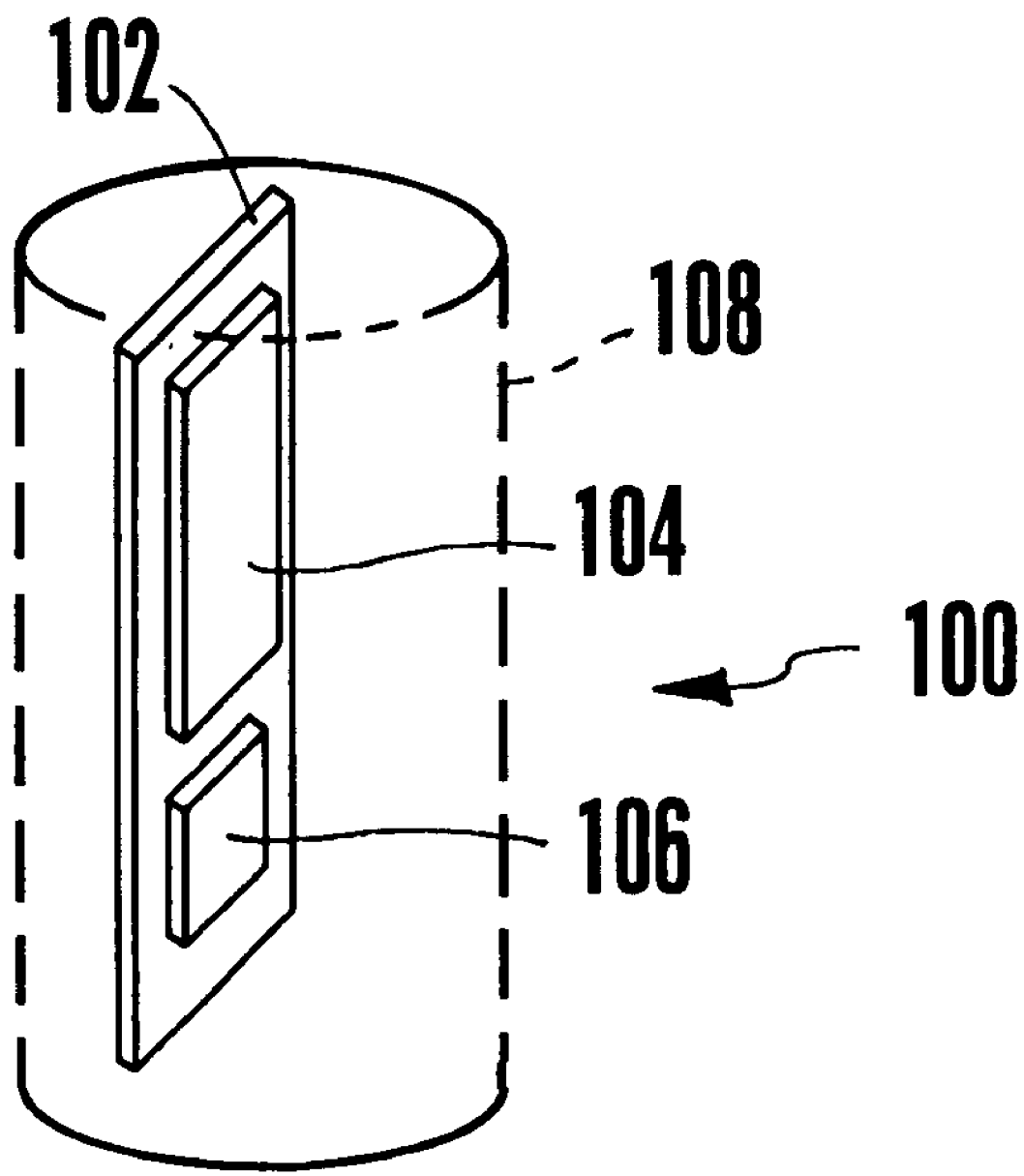
FIG. 5 is a schematic diagram of an alternate embodiment.

Referring initially to FIG. 1, a receiver tube 10 is shown mounted in an upright position in an oil pan 12. Liquid such as oil 14 of the engine 16 enters into the interior of the receiver tube 10 by any means, such as, e.g., through the open bottom end 17 of the receiver tube 10 or a hole (not shown) that is formed near the bottom end 17 of the tube 10. It is to be understood that the present invention can be used in a wide range of other applications that require measuring fluid level.

Now referring to FIG. 2, the receiver tube 10 is a hollow cylindrical tube fabricated out of conductive material. Level tube 20 and a reference tube 22, both fabricated from conductive material, are disposed in the receiver tube 10 coaxially with each other and with the receiver tube 10 coaxially with each other and with the receiver tube 10. As shown, the reference tube 22 is coaxially disposed in the receiver tube 10 below the level tube 20 relative to the upright position.

In accordance with the present invention, the level tube 20 and the receiver tube 10 together establish a first impedance value and the reference tube 22 and the receiver tube 10 together establish a second impedance value. The impedance can be modeled as a capacitor in parallel with a resistor. The impedances depend on the geometry of the tubes, the relative position of the tubes, and the physical properties of intermedium materials filled between the tubes. In one preferred embodiment, the intermedium material is oil; however the present invention is not limited to oil, but could use any appropriate liquid. As the skilled artisan will appreciate, the impedance is further dependent on the dielectric coefficient and conductivity of the liquid.

Referring now to FIG. 3, an electrical circuit generally designated 29, is shown that includes an input signal generator 30. In a preferred embodiment, the input signal generator 30 generates a triangle wave, although other waveforms can be used. In a first configuration of the circuit 29, the level tube 20 is in electrical combination with reference tube 22, and in a second configuration of the circuit 29, the level tube 20 is in electrical combination with an empty check capacitor 32. Analog switches 34 and 36 are used to select the level tube 20 with empty check capacitor 32 configuration and level tube 20 with reference tube 22 configuration, respectively. As disclosed further below, the reason for using the empty check capacitor 32 is to distinguish two possible liquid levels with the same output, with the reference tube 22 being used to compensate for variations in liquid physical properties. If desired, a reset switch 37 can be provided as shown. The skilled artisan will recognize that in the configuration shown, the reset switch 37 can be moved as appropriate to isolate the empty check capacitor and to reset the empty check capacitor.

Continuing the description of FIG. 3, in either configuration, the signal generator 30 is connected to an analog inverter 38 which inverts the polarity of the waveform signal with respect to the parallel path established by the setting of the analog switches 34 and 36. To select the empty check capacitor 32 (i.e., second) configuration, the analog switch 34 is configured to complete the circuit from the input signal generator 30 through the empty check capacitor to the input of a first amplifier circuit 40. In this configuration, the analog switch 36 connects the reference tube 22 to ground, and each path of the above-described parallel circuit establishes a signal level and a phase shift of the input signal generator waveform. These signal levels and phase shifts are summed together at the input of the first amplifier circuit 40. The output of the first amplifier circuit 40 is interconnected to a second amplifier circuit 42, which provides the final output of the circuit 29.

To select the first configuration (i.e., level tube 22 with receiver tube 10), the second analog switch 36 is configured to complete the path from the input signal generator 30 through the reference tube 22-receiver tube to the input of the first amplifier circuit 40. On the other hand, the first analog switch 34 is configured to interconnect the empty check capacitor 32 to ground. In this first configuration, each path of the parallel circuit establishes a signal level and a phase shift of the input signal generator waveform, with the signal levels and phase shifts being summed together at the input of the first amplifier circuit. The relationships between the input triangle waveform, receiver tube impedance, system parameters, and the electrical circuit output are shown in equations below:

$V_{OUT} = aA\Delta I$ $V_{L/E} = aA[(dV_{IN}/dt)(C_L - C_E) + (V_{IN}/R_L)]$ $V_{L/R} = aA[(dV_{IN}/dt)(C_L - C_R) + (V_{IN}/R_L) - (V_{IN}/R_R)]$ Where:
$\Delta I$=The current through the feedback impedance (A)
a=Coefficient of current to voltage converter (V/A)
A=gain of voltage amplifier (V/V)
$V_{IN}$=Input Voltage
$V_{L/E}$=Sensor output with level/empty configuration (V)
$V_{L/R}$=Sensor output with level/reference configuration (V)
$C_L$=Level sensing element capacitance (F)
$C_R$=Reference sensing element capacitance (F)
$C_E$=Empty check capacitance (F)
$R_L$=Level sensing element resistance ($\Omega$)
$R_R$=Reference sensing element resistance ($\Omega$)

FIG. 4 illustrates the output level from the circuit 29. This graph represents the difference of the impedance change of the system as oil level varies. As shown, the output 50 of the circuit 29 is at the highest value when the level tube 20 is completely full of engine oil 14. As the engine oil 14 level decreases within the level tube 20, the output of the sensor drops. When the engine oil 14 level is below the bottom of the level tube 20 but higher than the top of the reference tube 22, the output 50 reaches the lowest value, as shown at 52. As the engine oil 14 level continuous decreasing (below the top of the reference tube 22), the output of the circuit 29 will increase for the first circuit 29 configuration (i.e., level with reference tube 22) as shown at 54, and will stay constant for the second configuration level as shown at 56.

FIG. 5 shows an alternate sensor 100 wherein the receiver tube 10, level tube 20, and reference tube 22 have been respectively replaced by a reference plate 102, upper plate 104, and lower plate 106. The plates 104, 106 are closely spaced from the reference plate 102 and are vertically aligned with each other within a holder 108.

While the particular FLUID LEVEL MEASURING SYSTEM as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". All structural and functional equivalents to the elements of the above-described preferred embodiment that are known or later come to be known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. §112, sixth paragraph, unless the element is expressly recited using the phrase "means for".

What is claimed is:

1. A fluid level sensor, comprising:

a receiver tube positionable in a container of fluid;

a level tube coaxially disposed in the receiver tube;

a reference tube coaxially disposed in the receiver tube below the level tube relative to the upright orientation, each tube defining a respective interior communicating with the container, such that fluid in the pan can enter the interior of each tube, the level tube and receiver tube establishing a first capacitor, the reference tube and receiver tube establishing a second capacitor; and a circuit electrically connected to the tubes, the circuit including an output amplifier outputting a signal representative of voltage, at least one switch selectively connecting the second capacitor to ground, and at least one empty check capacitor connected to the switch, the switch being movable between a first position, wherein the second capacitor interconnects the output amplifier with the input signal generator and the empty check capacitor is connected to ground, and a second position, wherein the second capacitor is connected to ground and the empty check capacitor interconnects the output amplifier with the input signal generator.

2. The sensor of claim 1, wherein the input signal generator generates a triangle wave.

3. The sensor of claim 1, wherein the input signal generator generates a sinusoidal wave, square wave, or triangle wave.

4. An oil level sensor for a vehicle, comprising:

an oil pan;

a receiver tube disposed in the oil pan;

a level tube in the receiver tube;

a reference tube in the receiver tube below the level tube, each tube defining a respective interior communicating with the oil pan, such that oil in the pan can enter the interior of each tube, the level tube and receiver tube establishing a first capacitor, the reference tube and receiver tube establishing a second capacitor;

a circuit electrically connected to the tubes, the circuit including an output amplifier outputting a signal representative of voltage, an input signal generator, at least one switch selectively connecting the second capacitor to ground, at least one empty check capacitor connected to the switch, the first capacitor interconnecting the output amplifier and input signal generator, the switch being movable between a first position, wherein the second capacitor interconnects the output amplifier with the input signal generator and the empty check capacitor is connected to ground, and a second position, wherein the second capacitor is connected to ground and the empty check capacitor interconnects the output amplifier with the input signal generator.

5. The sensor of claim 4, wherein the input signal generator generates a triangle wave.

6. The sensor of claim 4, wherein the input signal generator generates a sinusoidal wave or square wave.

* * * * *